US011063882B2

(12) United States Patent
George et al.

(10) Patent No.: US 11,063,882 B2
(45) Date of Patent: Jul. 13, 2021

(54) RESOURCE ALLOCATION FOR DATA INTEGRATION

(71) Applicant: International Business Machines Corporation, Armonk, NY (US)

(72) Inventors: Juan M. George, Cochin (IN); Kalyanji Chintakayala, Hyderabad (IN); Krishna Kishore Bonagiri, Ambjipet (IN)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 16/533,879

(22) Filed: Aug. 7, 2019

(65) Prior Publication Data
US 2021/0044541 A1     Feb. 11, 2021

(51) Int. Cl.
*H04L 12/911* (2013.01)
*H04L 12/24* (2006.01)
*H04L 29/08* (2006.01)

(52) U.S. Cl.
CPC ........ *H04L 47/783* (2013.01); *H04L 41/5019* (2013.01); *H04L 47/828* (2013.01); *H04L 67/10* (2013.01)

(58) Field of Classification Search
CPC . H04L 47/783; H04L 41/5019; H04L 47/828; H04L 67/10; H04L 67/24; H04L 67/02; H04L 12/1813; H04L 29/08594; H04L 41/026; H04L 41/5093; H04L 43/16; H04L 51/04; H04L 67/025; H04L 67/142; H04L 67/145; H04L 67/306; G06F 1/329; G06F 8/4432; G06F 9/4893; H04W 52/0296
See application file for complete search history.

(56) References Cited

U.S. PATENT DOCUMENTS

| | | | | |
|---|---|---|---|---|
| 6,065,046 A | * | 5/2000 | Feinberg | G06F 9/44521 709/216 |
| 6,801,822 B1 | * | 10/2004 | Fujiwara | G05B 19/41875 700/108 |
| 7,734,683 B1 | * | 6/2010 | Bergenwall | H04L 61/2053 709/203 |
| 8,347,317 B1 | * | 1/2013 | Balaji | H04W 4/023 719/318 |

(Continued)

FOREIGN PATENT DOCUMENTS

CN          105007172 A     10/2015

OTHER PUBLICATIONS

Du, Junping, "[YARN-4576] Enhancement for Tracking Blacklist in AM Launching", Apache Software Foundation, Hadoop YARN, printed on Jul. 2, 2019, 2 pages, <https://issues.apache.org/jira/browse/YARN-4576>.

(Continued)

*Primary Examiner* — Ninos Donabed
(74) *Attorney, Agent, or Firm* — David K. Mattheis; William H. Hartwell; Nicholas L. Cadmus

(57) ABSTRACT

Improving allocation of network resources by receiving node names for resource allocation, checking a bookmark file of bad nodes for the received node names, selecting good nodes from the received nodes for command execution, sending commands to selected good nodes, identifying bad nodes during command execution; and adding the identified bad nodes to the bookmark file.

14 Claims, 4 Drawing Sheets

(56) References Cited

U.S. PATENT DOCUMENTS

| | | | | |
|---|---|---|---|---|
| 8,443,367 B1* | 5/2013 | Taylor | G06F 9/52 | |
| | | | 718/102 | |
| 8,762,298 B1* | 6/2014 | Ranjan | H04L 63/14 | |
| | | | 706/12 | |
| 9,787,761 B2 | 10/2017 | Bonagiri | | |
| 10,028,087 B2* | 7/2018 | Haapanen | H04W 4/029 | |
| 10,241,836 B2* | 3/2019 | Bai | G06F 9/5022 | |
| 2004/0073715 A1* | 4/2004 | Folkes | H04L 45/7457 | |
| | | | 709/250 | |
| 2004/0153832 A1* | 8/2004 | Hasha | G06T 1/00 | |
| | | | 714/38.1 | |
| 2007/0109592 A1* | 5/2007 | Parvathaneni | H04L 67/1034 | |
| | | | 358/1.15 | |
| 2011/0044339 A1* | 2/2011 | Kotalwar | H04L 47/125 | |
| | | | 370/392 | |
| 2012/0102192 A1* | 4/2012 | Takeshima | H04L 29/12066 | |
| | | | 709/224 | |
| 2012/0140775 A1* | 6/2012 | Kawahara | H04L 41/0896 | |
| | | | 370/437 | |
| 2013/0163410 A1* | 6/2013 | Sen | H04W 84/20 | |
| | | | 370/221 | |
| 2014/0075017 A1* | 3/2014 | Wang | G06F 9/5027 | |
| | | | 709/224 | |
| 2014/0089453 A1* | 3/2014 | Pandey | G06F 9/542 | |
| | | | 709/213 | |
| 2014/0181176 A1* | 6/2014 | Swamy B. V. | H04L 41/0853 | |
| | | | 709/203 | |
| 2015/0277955 A1* | 10/2015 | Iwamatsu | G06F 9/45558 | |
| | | | 718/1 | |
| 2015/0363238 A1* | 12/2015 | Bai | G06F 9/5022 | |
| | | | 718/1 | |
| 2015/0363284 A1* | 12/2015 | Ishii | G06F 3/0629 | |
| | | | 714/6.23 | |
| 2015/0370587 A1* | 12/2015 | Kureha | G06F 9/45558 | |
| | | | 718/1 | |
| 2016/0012657 A1* | 1/2016 | Reineccius | G06Q 20/22 | |
| | | | 705/39 | |
| 2016/0048415 A1 | 2/2016 | Sarma | | |
| 2016/0266951 A1 | 9/2016 | Swamy BV | | |
| 2017/0289750 A1* | 10/2017 | Haapanen | H04W 4/02 | |

OTHER PUBLICATIONS

Mell et al., "The NIST Definition of Cloud Computing", Recommendations of the National Institute of Standards and Technology, Special Publication 800-145, Sep. 2011, 7 pages.

Zhang, et al., "Fuxi: A Fault-Tolerant Resource Management and Job Scheduling System at Internet Scale" Very Large Data Bases, Sep. 1-5, 2014, Hangzhou, China, Proceedings of the VLDB Endowment, vol. 7, No. 13, 12 pages, Copyright 2014 VLDB Endowment 2150-8097/14/08.

* cited by examiner

RESOURCE ALLOCATION FOR DATA INTEGRATION

BACKGROUND

The disclosure relates generally to managing computing resources for application execution. The disclosure relates particularly to reducing cloud application execution latency by managing cloud resource utilization with multi-stage processing of the application's instructions.

Distributed Data integration (DI) jobs involve reading, combining, transforming, and storing data from diverse sources to provide a unified view of the data. DI jobs can be run using distributed network nodes. The nodes allocated for each DI job are specified in a node configuration profile. Allocated nodes can be statically or dynamically utilized by a system's resource manager for executing applications. Resource management (RM) tools offer resource allocation from a cluster for an application.

Configuration files in the RM tools provide the DI job with information about network nodes available to run the job. The configuration file can contain static nodes on which a partition of data is processed, and dynamic nodes which are allocated by the RM based upon the availability of resources in the cluster at the time of execution of the job.

A job executor executes the DI job from start to finish. Among other steps, the job executor sends a configuration file including a list of required node names to the RM. The RM then allocates resources for the node names and sends the list of node names with allocated resources back to the job executor. The job executor also sends commands to the RM for launching on the nodes having allocated resources.

SUMMARY

Aspects of the invention disclose methods, systems and computer readable media associated with improving the allocation of computing resources by receiving node names for resource allocation, checking a bookmark file of bad nodes for the received node names, selecting good nodes from the received node names for command execution, sending commands to selected good nodes, identifying bad nodes during command execution; and adding the identified bad nodes to the bookmark file.

DETAILED DESCRIPTION

Figure 1:
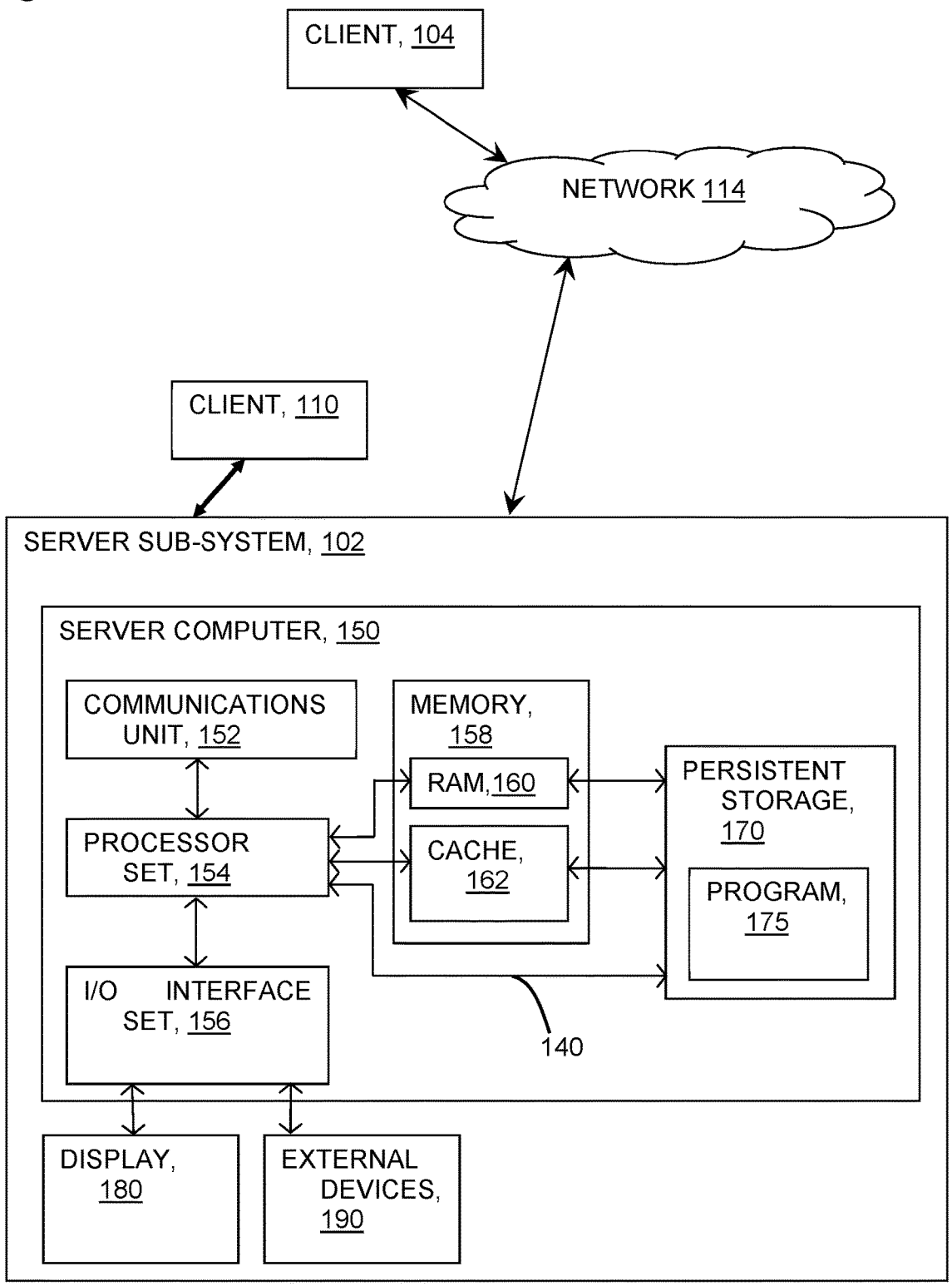
FIG. 1 provides a schematic illustration of a system, according to an embodiment of the invention.

DI jobs can be run using dynamic node names, with the choice of physical nodes for the DI job made by the RM as commands are passed for execution. The chosen nodes can be unusable for the DI job for a variety of reasons. In HADOOP environments it is common for new nodes to be added. All added nodes may not be suitable for DI jobs, some of the new nodes are unusable as they are added. Such unusable nodes can be called bad nodes. The bad nodes appear usable to the RM for the DI job but in practice are not.

After a job description and configuration file are received, an execution plan is generated according to the description and configuration file, including the listing of available nodes included in the configuration file. The listing of nodes is passed to the RM together with the execution plan. The RM allocates resources to nodes in the provided listing and job commands are sent to the allocated nodes according to the execution plan.

Commands sent to bad nodes, unrecognized as such by the RM, fail to complete. Failed commands can be re-executed but may be allocated to the same bad nodes as the RM still considers the nodes to be available for allocation. Failed commands can generate errors and delays, can cause the job to fail as well. Delays, errors and failed jobs can lead to missed Service Level Agreement (SLA) time commitments, leading to unhappy customers.

The bad nodes may be unusable for reasons including: the absence of required software for the node, the lack of necessary libraries, improper mounting of the nodes in the cluster, the nodes can be in an inconsistent state and unavailable to the execute the requested job, and commodity hardware nodes which are added and removed frequently may not have the necessary allocated resources.

In contrast to the bad nodes, good nodes have all the required software and libraries. Good nodes are properly mounted in the cluster, are in a consistent state and are available to perform the requested job. Good nodes have the necessary allocated resources.

The operating system and RM are not aware of which nodes are unusable for the DI job execution, so allocation of jobs to the bad nodes cannot be easily avoided at that level. Some RM programs (HADOOP YARN) allow nodes to be specified at the Application Master level, but not at the node cluster level which would enable the bad node designation to persist across multiple Application Master programs. After a command execution has failed due to a bad node, there is no mechanism available for a container to block subsequent execution attempts from being allocated to the same bad node which caused the execution failure, as that permission resides only with the Application Master.

What is needed is a mechanism which will learn which nodes are bad, maintain a listing of the bad nodes, and prevent the RM from allocating commands to the bad nodes. The disclosed systems and methods identify bad nodes associated with errors during job execution, and check new nodes added to HADOOP do see if the nodes are usable or bad. The systems and methods maintain a listing of bad nodes and track node status and reinstate nodes as good when the status of the nodes has changed.

In an embodiment, a job description and accompanying node configuration files are received by a system utilizing the method of the disclosed invention. The configuration file includes node names for possible resource allocation by the RM for the job execution. The files are read by the system and an execution plan is generated to carry out the commands of the received job. The execution plan allows the commands of the job to be dynamically allocated by an RM on the available nodes identified in the configuration file. The generated execution plan is sent to the RM. The RM extracts the identified node names from the configuration file. In this embodiment, the RM checks for the existence of a bookmark file of bad, or blacklisted, nodes.

The RM selects identified nodes from the configuration file which are not listed in the bookmark file—avoiding any bad nodes. The RM allocates resources for the selected 'good' nodes and provides the selected good node names to the job executor. Configuration objects, and all other objects that depend upon actual node names, are prepared for the execution of the commands of the job using the selected good nodes.

The job executor prepares job commands for execution and sends the prepared commands to allocated good nodes. Execution of the sent commands is attempted on the allocated nodes. In some instances, the attempted execution of the commands will fail due to issues with the allocated node. In these instances, the command execution failure will set a software flag and due to the set flag, the name of the allocated node which has failed to execute the command is added to the bookmark file of bad nodes.

In an embodiment, the book mark file is a HADOOP™ Distributed File System (HDFS) file. The distributed nature of the HDFS means that all nodes, and the RM, can access the bookmark file at all times during system operation.

In an embodiment, in addition to identifying bad nodes due to command execution failures, all nodes of all system clusters are periodically checked to identify bad nodes. In an embodiment, the nodes are checked daily, for example each night when system operational usage declines, or on another periodic basis selected by system administrators as suitable considering system operating requirements.

In an embodiment, the nodes of each cluster are checked to determine that the mounted directories required for running DI jobs are accessible to the node. In this embodiment, the program checks DATASTAGE™ binaries for a DATASTAGE™ job to ensure that they exist and are accessible in the information server installation path on the node.

In this embodiment, the program checks user' permissions to ensure that the user has the required permissions to access the necessary directories on the node. In this embodiment, the program checks to ensure that there is enough space in the temp directory such that any attempt to localize binaries will not fail, etc. The program checks nodes to ensure that the user exists on the node. Systems utilizing KERBEROS authentication ensure that the node can authenticate with the KDC server. The program also checks nodes to determine if all libraries required for DI jobs are present, and to ensure that all required system resources are available to the nodes. The program adds any nodes lacking the required directories, libraries, or resources, to the HDFS bookmark file as a bad node.

(Note: the terms "HADOOP", "YARN", "KERBEROS" and "DATASTAGE" may be subject to trademark rights in various jurisdictions throughout the world and are used here only in reference to the products or services properly denominated by the marks to the extent that such trademark rights may exist.)

In an embodiment, a notification is sent to system support personnel each time a node is added to the HDFS bad node bookmark file. In this embodiment, the notification provides the date, time and circumstances relating to the addition of the node to the bookmark file. The notification can be sent by email, text message or other system communication channel. In this embodiment, the notification message: TFPMXXX "Blacklisting of nodes is enabled. Node, 'hwdx1.fyre.ibm.com' is being black listed. Black list file in HDFS is: '/user/dsadm/PXApplication/badnodes' is sent.

In an embodiment, as nodes are checked, good nodes are checked against the names in the bookmark file of bad nodes. The names of nodes which have been identified as "good" are removed from the bookmark file, keeping the bookmark file current regarding both good and bad nodes.

In an embodiment, new nodes are added to clusters. As each new node is added to a cluster, the node is checked as described above, to determine the status of the node as either a good node or a bad node. Nodes identified as bad are added to the HDFS bookmark file and notifications are sent to system administration and/or support personnel regarding the bad nodes.

In an embodiment, a job reads transaction logs which are stored in an HDFS file and transforms the records which are read as needed. The method writes the transformed records to different relational data base management system (RDMS) tables. Data scientists access the tables to generate reports for business decision making.

The configuration file for this example would be:

```
{
    node "conductor_node"
    {
        fastname "dx1.fyre.name.com"
        pools ""
        resource disk "/opt/NAME/InformationServer/Server/Datasets" {pools ""}
        resource scratchdisk "/opt/NAME/InformationServer/Server/Scratch" {pools ""}
    }
    node "processing node "
    {
        fastname "$host"
        pools ""
        resource disk "/optDatasets" {pools ""}
        resource scratchdisk "/opt/Scratch" {pools ""}
        instances 4
    }
}
```

Through this example, the method prepares an execution plan for the submitted job using the flowing steps:
 a. Job is submitted for execution.
 b. The YarnClient requests RM for an application master (AM) to execute the job.
 c. The RM looks for an AM to execute the job (creates one if it does not exist) and passes the AM information to the YarnClient.
 d. The YarnClient provides the AM with commands to start the job execution and the configuration file.
 e. The AM uses the information from the configuration file to submit a request to the RM for four containers.
 f. The RM tries to identify four containers in different nodes in the cluster.
 g. Based on the availability of resources in nodes in the cluster (excluding bad nodes). The RM allocates four containers and passes that information to the AM.

h. The AM starts job execution of commands in these containers to execute job in parallel.
i. During the execution, if the job execution fails in any of the allocated nodes, that node will be added to the bad node list.
j. A bad node will not be taken for container allocation during next execution of any job.

The resulting execution plan for the example would be:

```
main_program: This step has 2 datasets:
    ds0: {op0[1p] (sequential Read_from_HDFS)
       eAny<>eCollectAny
       op1[4p] (parallel APT_TransformOperatorImp1V0S1_test_Transform_Records in
Transform_Records)}
       ds1: {op1[4p] (parallel APT_TransformOperatorImp1V0S1_test_Transform_Records in
Transform_Records)
       eAny=>eCollectAny
       op2[4p] (parallel write_to_DB2)}
    It has 3 operators:
    op0[1p] {(sequential Read_from_HDFS)
       on nodes(
          conductor_node[op0,p0]
       )}
    op1[4p] {(parallel APT_TransformOperatorImp1V0S1_test_Transform_Records in
Transform_Records)
       on nodes(
          conductor_node[op1,p0]
          processing node [op1,p1]
          processing node _1[op1,p2]
          processing node _2[op1,p3]
       )}
    op2[4p] {(parallel write_to_DB2)
       on nodes(
          conductor_node[op2,p0]
          processing node [op2,p1]
          processing node _1[op2,p2]
          processing node _2[op2,p3]
       )}
    It runs 9 processes on 4 nodes.
    Node conductor_node estimated container size is 166MB
    Node processing node estimated container size is 48MB
    Node processing node _1 estimated container size is 48MB
    Node processing node _2 estimated container size is 48M
```

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise a client portion of a node allocation program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the node allocation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., node allocation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
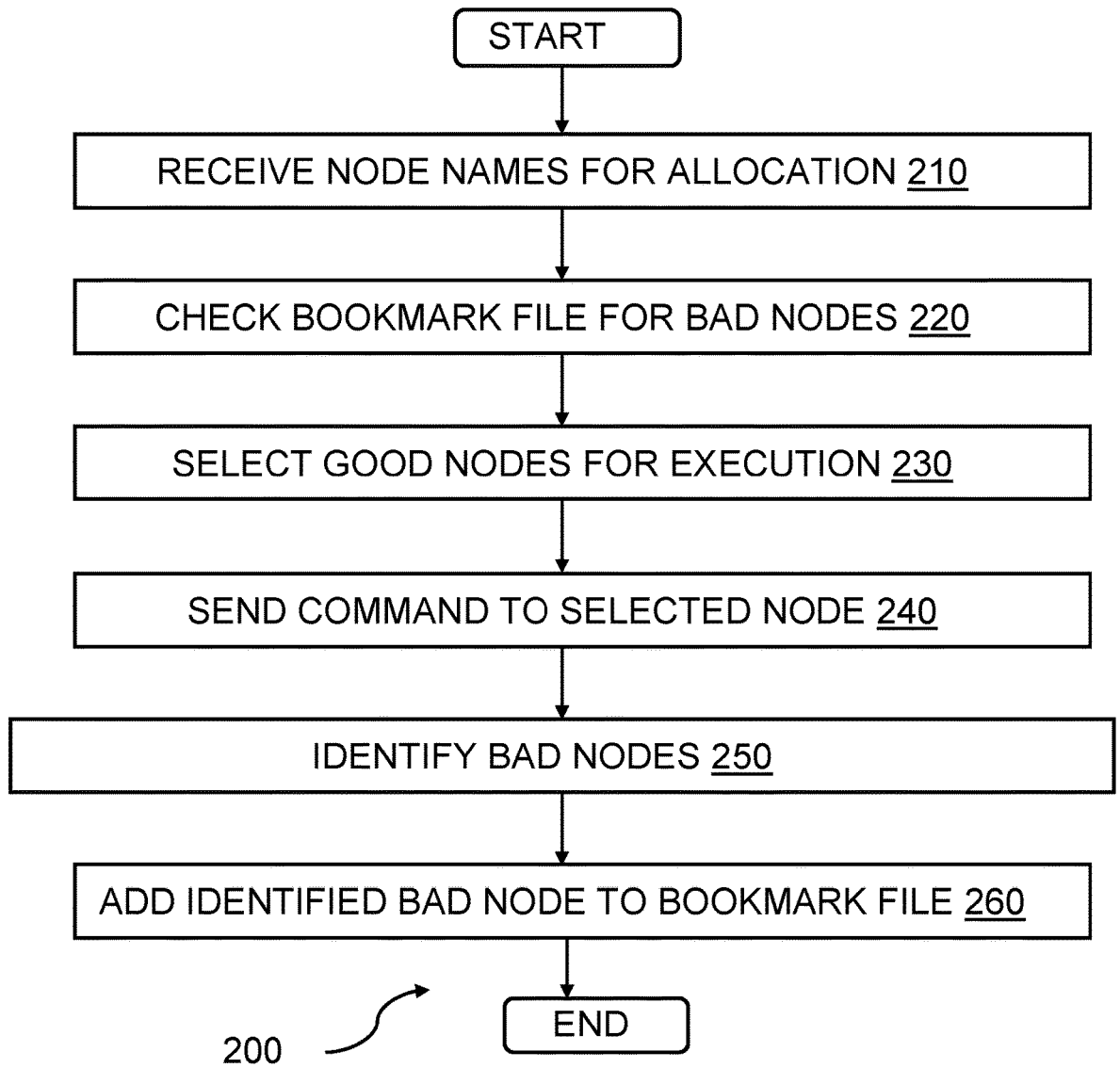
FIG. 2 provides a flowchart depicting an operational sequence, according to an embodiment of the invention.

FIG. 2 provides a flowchart 200, illustrating exemplary activities associated with the practice of the disclosure. After program start, node allocation program 175 receives a listing of node names available for allocation at 210. The program reads the listing of node names from a configuration file accompanying the DI job description. The program provides the listing of available node names to the RM along with the commands required as part of the DI job execution plan. The program accompanies the listing with a request from the job executor that the RM allocate resources to available nodes for execution of the commands. The RM checks for the existence of a non-zero bookmark file of bad node names. At 220, the RM cross-checks the listing of available nodes with the listing of node names in the bookmark file of bad nodes. The RM ignores available bad nodes found in the bookmark file and selects good nodes from the listing of available nodes which are not present in the listing of the bookmark file at 230. The RM allocates system resources to the selected good nodes. At 240, the program sends DI job commands to the selected nodes having allocated resources. The method tracks the success or failure of the command completion. The program reports successful completion of the command back to the job executor together with the results of the command's execution. The program identifies node names associated with failed completions results as bad nodes at 250, and then adds the names of the newly identified bad nodes to the bookmark file of bad nod names at 260. Command failure can occur due to required resource for the command being nonexistent or inaccessible on the assigned node. Execution of a job by a user lacking the necessary permissions can lead to command failure. A node lacking sufficient space in the/tmp directory to localize binaries can lead to failure. Execution of a job by a user who does not exist on the node can also cause command failure. The program reports the failure of the command to complete out to the job executor and schedules the command for execution once again. The subsequent effort to complete the command requires a new node allocation from the RM. The RM once again reviews the listing of available node names against the listing of bad nodes in the bookmark file, the newly identified bad node is not selected for allocation to the repeat execution of the command.

In an embodiment, also at 250, the newly added nodes of each cluster are checked to determine that the mounted directories required for running DI jobs are accessible to the node. In this embodiment, the program checks DATASTAGE™ binaries for a DATASTAGE™ job to ensure that they exist and are accessible in the information server installation path on the node. In this embodiment, the program checks user' permissions to ensure that the user has the required permissions to access the necessary directories on the node. In this embodiment, the program checks to ensure that there is enough space in the temp directory such that any attempt to localize binaries will not fail, etc. The program checks nodes to ensure that the user exists on the node. Systems utilizing KERBEROS authentication ensure that the node can authenticate with the KDC server. The program also checks nodes to determine if all libraries required for DI jobs are present, and to ensure that all required system resources are available to the nodes. The program adds any nodes lacking the required directories, libraries, or resources, to the HDFS bookmark file as a bad node.

In an embodiment, the program sends notifications to the user relating the addition or removal of nodes from the bookmarked bad nodes HDFS file.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
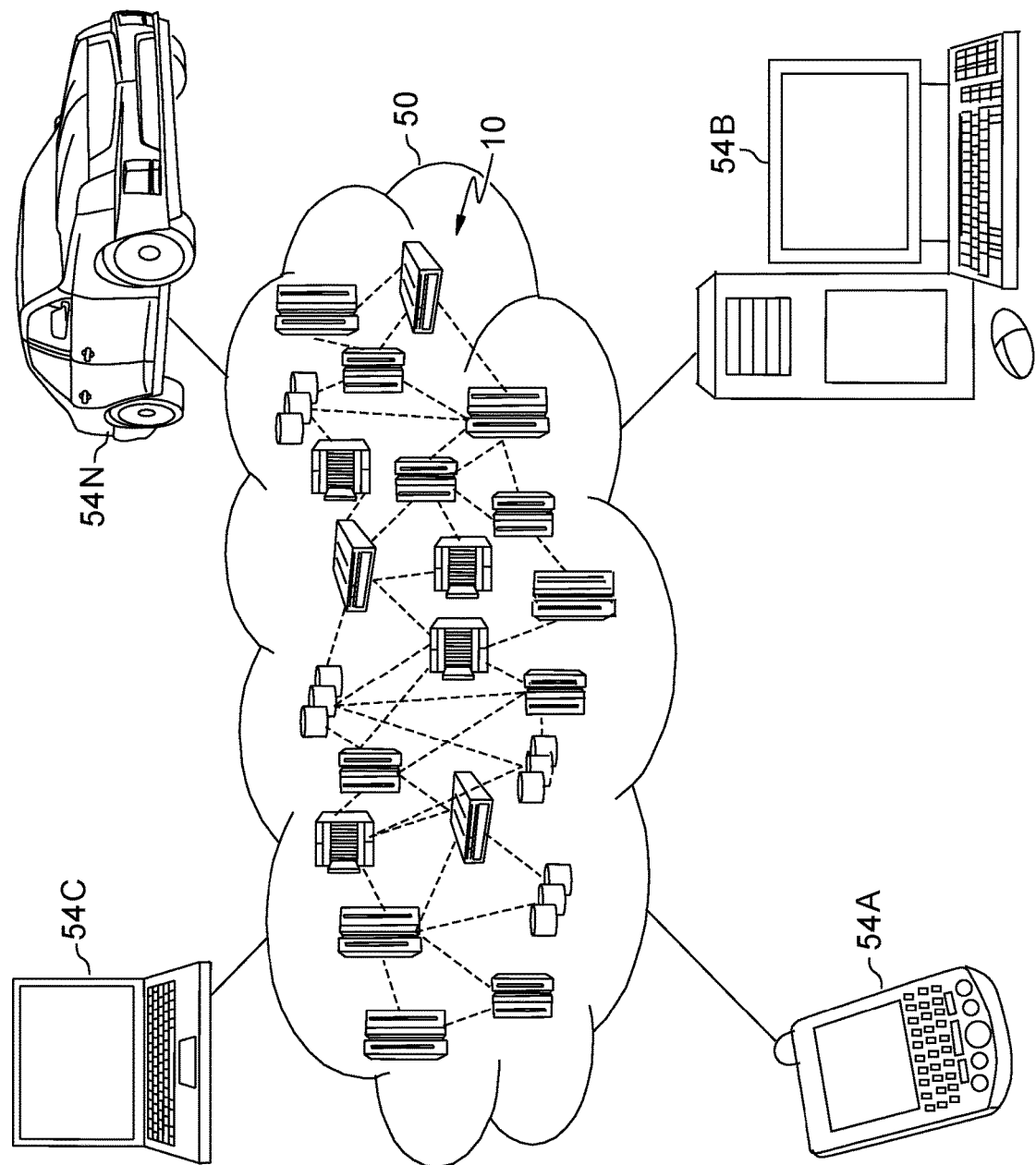
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
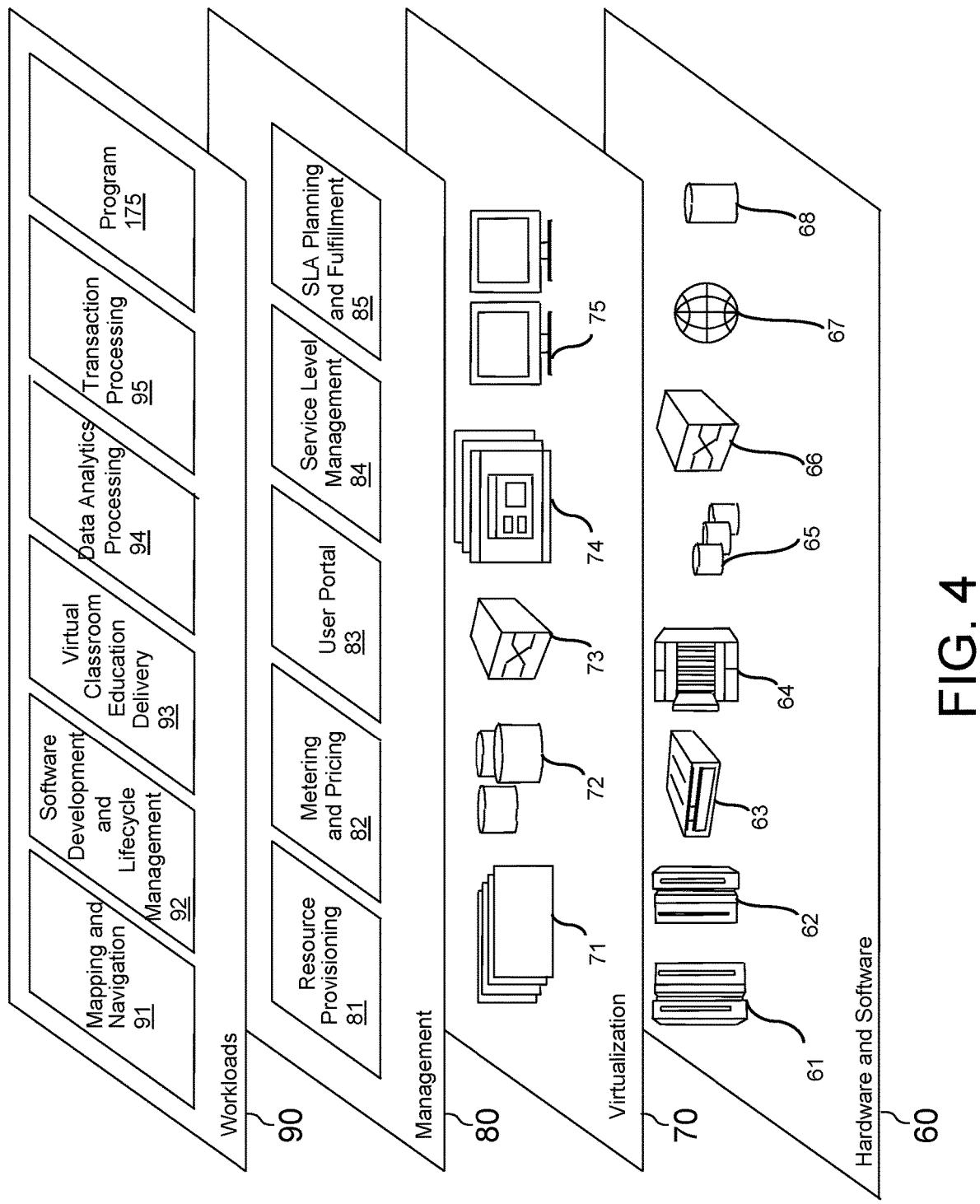
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and node allocation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for allocating network resources, the method comprising:
   receiving, by one or more computer processors, a configuration file of node names for resource allocation;
   extracting a node name from the configuration file;
   checking, by the one or more computer processors, for the extracted node name in a bookmark file of nodes unusable for data integration jobs;
   responsive to not finding the extracted node name in the bookmark file,
   sending, by the one or more computer processors, a command to the node having the extracted node name;
   identifying, by the one or more computer processors, additional nodes unusable for data integration jobs during command execution;
   adding, by the one or more computer processors, the names of the additional nodes unusable for data integration jobs to the bookmark file;
   periodically checking, by the one or more computer processors, a status of a node of a cluster;
   identifying, by the one or more computer processors, a node unusable for data integration jobs in the cluster; and
   adding, by the one or more computer processors, the node unusable for data integration jobs to the bookmark file;
   identifying, by the one or more computer processors, a node usable for data integration jobs in the cluster; and
   removing, by the one or more computer processors, the node usable for data integration jobs from the bookmark file.

2. The computer implemented method according to claim 1, further comprising:
   adding, by the one or more computer processors, a new node to a cluster;
   checking, by the one or more computer processors, a status of the new node; and
   adding, by the one or more computer processors, the new node to the bookmark file.

3. The computer implemented method according to claim 2, wherein checking the status of the new node comprises checking a new node aspect selected from the group consisting of: accessible directories, libraries present, and available system resources.

4. The computer implemented method according to claim 1, wherein the bookmark file comprises a Hadoop Distributed File System file.

5. The computer implemented method according to claim 1, further comprising sending, by the one or more computer processors, a notification associated with nodes unusable for data integration jobs in the bookmark file.

6. A computer program product for allocating network resource, the computer program product comprising one or more computer readable storage devices and stored program instructions on the one or more computer readable storage devices, the stored program instructions comprising:
   program instructions for receiving a configuration file of node names for resource allocation;
   program instructions for extracting a node name from the configuration file;
   program instructions for checking for the extracted node name in a bookmark file of nodes unusable for data integration jobs;
   program instructions for sending a command to the node having the extracted node name in response to not finding the extracted node name in the bookmark file;
   program instructions for identifying additional nodes unusable for data integration jobs during command execution;
   program instructions for adding names of the additional nodes unusable for data integration jobs to the bookmark file;
   program instructions for periodically checking a status of a node of a cluster;
   program instructions for identifying a node unusable for data integration jobs in the cluster;
   program instructions for adding the node unusable for data integration jobs to the bookmark file;
   program instructions for identifying a node usable for data integration jobs in the cluster; and
   program instructions for removing the node usable for data integration jobs from the bookmark file.

7. The computer program product according to claim 6, the stored program instructions further comprising:
   program instructions for adding a new node to a cluster;
   program instructions for checking a status of the new node; and
   program instructions for adding the new node to the bookmark file.

8. The computer program product according to claim 7, wherein checking the status of the new node comprises checking a new node aspect selected from the group consisting of: accessible directories, libraries present, and available system resources.

9. The computer program product according to claim 6, wherein the bookmark file comprises a Hadoop Distributed File System file.

10. The computer program product according to claim 6, the stored program instructions further comprising sending a notification associated with nodes unusable for data integration jobs in the bookmark file.

11. A computer system for allocating network resources, the computer system comprising:
- one or more computer processors;
- one or more computer readable storage devices;
- stored program instructions on the one or more computer readable storage devices for execution by the one or more computer processors, the stored program instructions comprising:
- program instructions for receiving a configuration file of node names for resource allocation;
- program instructions for extracting a node name from the configuration file;
- program instructions for checking for the extracted node name in a bookmark file of nodes unusable for data integration jobs;
- program instructions for sending a command to the node having the extracted node name in response to not finding the extracted node name in the bookmark file;
- program instructions for identifying additional nodes unusable for data integration jobs during command execution;
- program instructions for adding names of the additional nodes unusable for data integration jobs to the bookmark file;
- program instructions for periodically checking a status of a node of a cluster;
- program instructions for identifying a node unusable for data integration jobs in the cluster;
- program instructions for adding the node unusable for data integration jobs to the bookmark file;
- program instructions for identifying a node usable for data integration jobs in the cluster; and
- program instructions for removing the node usable for data integration jobs from the bookmark file.

12. The computer system according to claim 11, the stored program instructions further comprising:
- program instructions for adding a new node to a cluster;
- program instructions for checking a status of the new node; and
- program instructions for adding the new node to the bookmark file.

13. The computer system according to claim 12, wherein checking the status of the new node comprises checking a new node aspect selected from the group consisting of: accessible directories, libraries present, and available system resources.

14. The computer system according to claim 11, the stored program instructions further comprising sending a notification associated with nodes unusable for data integration jobs in the bookmark file.

* * * * *